United States Patent [19]

White

[11] Patent Number: 4,498,775
[45] Date of Patent: Feb. 12, 1985

[54] METHOD FOR DETECTING DISTANCE DEVIATIONS TO A PHOTORESIST SURFACE IN AN OPTICAL PRINTER

[75] Inventor: Lawrence K. White, Cranbury, N.J.

[73] Assignee: RCA Corporation, New York, N.Y.

[21] Appl. No.: 349,515

[22] Filed: Feb. 17, 1982

[51] Int. Cl.$^3$ ............................................. G01B 11/02
[52] U.S. Cl. ..................................... 356/375; 356/358
[58] Field of Search ............... 356/354, 355, 356, 357, 356/358, 373, 375

[56] References Cited

U.S. PATENT DOCUMENTS

| | | | |
|---|---|---|---|
| 3,797,939 | 3/1974 | Pryor | 356/355 |
| 3,994,584 | 11/1976 | Pryor | 356/354 |
| 4,403,860 | 9/1983 | Pryor | 356/375 |

OTHER PUBLICATIONS

"Maintenance and Repair Instructions for Micralign Models 220 and 240", by Perkin-Elmer, Norwalk, Connecticut, pp. 5-13 to 5-21.

Hamilton et al., *Basic Integrated Circuit Engineering*, McGraw-Hill, ©1975, pp. 16, 17, 20-23.

Kasdan et al., "Linewidth Measurement by Diffraction Pattern Analysis", SPIE, vol. 80, Developments in Semiconductor Microlithography, (1976), pp. 54-63.

*Primary Examiner*—R. A. Rosenberger
*Attorney, Agent, or Firm*—Birgit E. Morris; Donald S. Cohen; Joseph D. Lazar

[57] ABSTRACT

A device for monitoring gap deviations in an optical printer comprises a mask having a plurality of closely-spaced differently-sized apertures. Actinic light passing through the aperture to a photoresist surface develops a pattern of diffraction-induced images in the photoresist surface. Each image is uniquely shaped according to its associated aperture size, gap dimension, light wavelength and photoresist characteristics. An indexing parameter ($\Delta \nu$) is used to relate the pattern of images developed to gapping or focusing deviations in the system. Either proximity or projection printers can be used.

10 Claims, 10 Drawing Figures

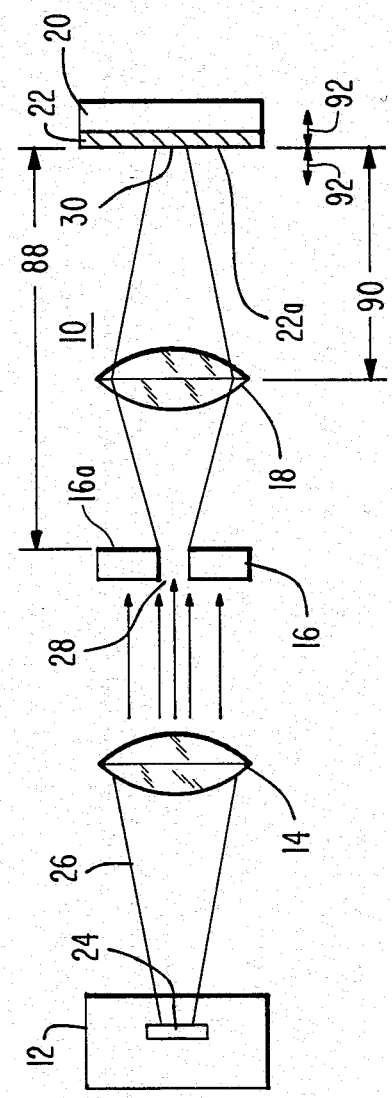
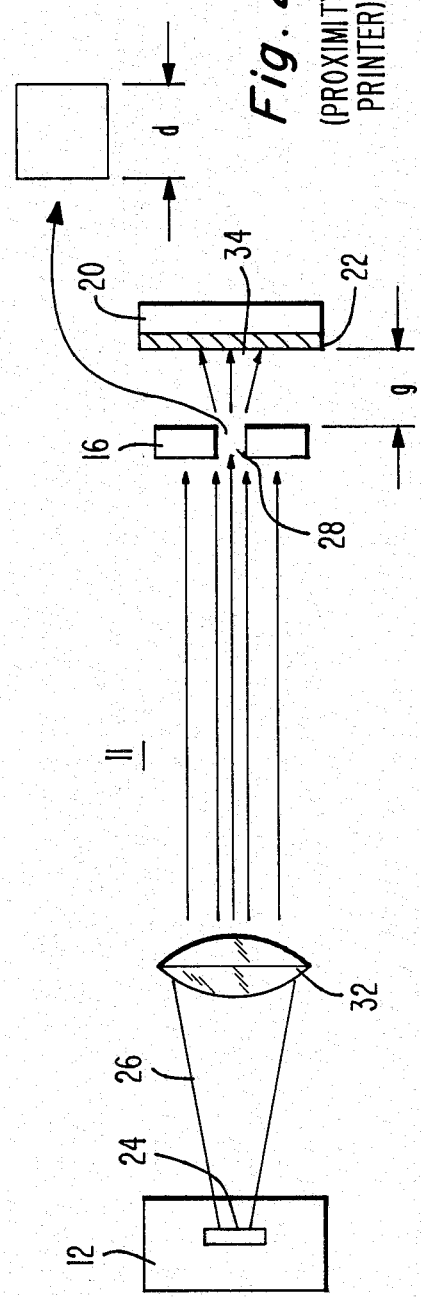
Fig. 1 (PROJECTION PRINTER)
Fig. 2 (PROXIMITY PRINTER)

54
$\Delta V = 2.4$
$4 \times 4 \mu m$
$3 \mu m$

52
$\Delta V = 3.0$
$5 \times 5 \mu m$
$3 \mu m$

56
$\Delta V = 1.8$
$3 \times 3 \mu m$
$3 \mu m$ $\Delta V = 6.04$
$10 \times 10 \,\mu m$ $\Delta V = 3.63$
$6 \times 6 \,\mu m$

METHOD FOR DETECTING DISTANCE DEVIATIONS TO A PHOTORESIST SURFACE IN AN OPTICAL PRINTER

This invention relates to a monitoring device and method for determining distance deviations such as gapping or focusing deviations in an optical printer.

BACKGROUND OF THE INVENTION

Flatness deviations in the photoresist substrate and the photomask and other gapping or focusing parameters are a significant factor in non-contact photolithographic methods. The deviations in the gapping or focusing of the photoresist substrate contribute to poor photoresist images, linewidth non-uniformities and erratic step coverage by the photoresist material. Heretofore, techniques for determining gapping deviations between the photoresist substrate and photomask in the proximity printing art or focus deviations in the projection printing art have been detected by errors in the end product after much time and effort has been put into its development. Optical microscopic techniques and scanning electron microscope techniques are used to identify to some extent the deviations causing these problems.

There is a need in the art for a method of quantitatively determining deviations in the photosubstrate or photomask affecting the developed resist image from a photomask.

SUMMARY OF THE INVENTION

According to the invention a method for determining gapping or focusing deviations in an optical printer comprises the use of a mask having a plurality of closely-spaced differently-sized apertures having square corners. Actinic light, preferably monochromatic light, having at least a wavelength corresponding to the photoresist response characteristics is passed through a series of mask apertures of variable dimensions to produce a characteristic diffraction pattern for each respective aperture. The shape of the respective photoresist patterns are used to determine variations that may exist in the desired distance between the mask and the surface carrying the photoresist material.

DETAILED DESCRIPTION OF A PREFERRED EMBODIMENT OF THE INVENTION

The drawing to which reference shall be made in the following description comprises:

FIG. 1 which is a schematic of a projection printer useful in practicing the invention;

FIG. 2 is a schematic of a proximity printer useful in practicing the invention;

Figure 3:
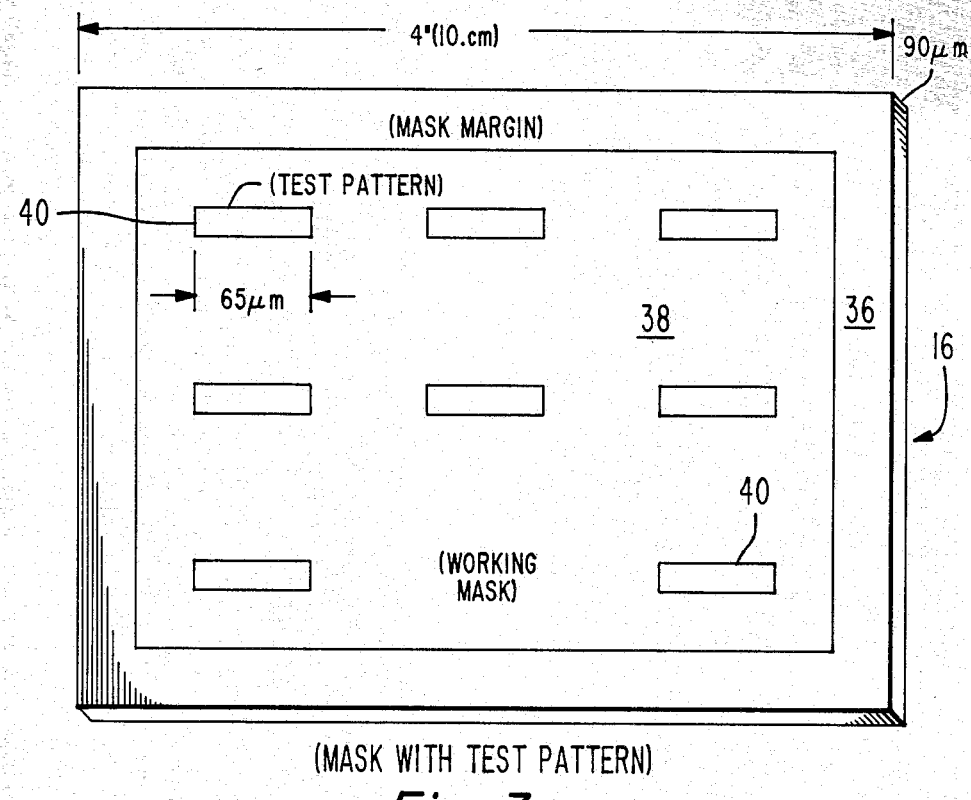
FIG. 3 is a diagram of a typical mask used in optical printing including locations of the test patterns according to the invention.

FIG. 6a–e are micrographs of illustrative diffraction-induced micrograph images according to the invention in a positive photoresist.

One form of optical printer useful in practicing the invention is a projection printer as shown in FIG. 1. Printer 10 comprises a lamp source 12 having a condensing lens 14, a mask 16, an output lens 18 for projecting the image of the mask 16 on the substrate or wafer 20 having a photoresist film 22 with a surface 22a. A suitable projection printer is the Perkin Elmer 220 projection printer.

Lamp source 12 comprises, for example, a mercury (Hg) vapor source 24 developing a beam of light 26 that illuminates the surface 22a depending upon the apertures through the mask 16. For example, an aperture 28 in mask 16 passes a light beam to illuminate the surface portion 30 of the surface 22a. The photoresist 22, when developed, will provide a pattern that can be microscopically examined at the exposure area 30 corresponding or related to the aperture 28 and the diffractive effects of the light as will be further explained.

Reference is now made to FIG. 2 illustrating a proximity printer 11 useful in the practice of the invention. The printer 11 comprises a lamp source 12 having a light source 24 typically a mercury vapor lamp generating a beam of light 26 which is focused by a lens or lens system 32 onto a mask 16 placed in close proximity, about 15 micrometers, before a wafer or substrate 20 carrying a photoresist film 22. An aperture 28 in the mask 16 passes light from the focused beam 26 onto the surface of the photoresist 22 developing a photoresist image 34 thereon. The aperture 28 is preferably a square having a dimension d. The gap between the mask and the photoresist surface is g.

A suitable proximity printer is a Canon PLA 500F proximity printer. The photoresist material 22 is suitably HPR 204 (Hunt Chemical Company) positive photoresist. Conventional procedures are used to pattern and develop the resist. The mercury vapor light source 24 was used without any intervening filters. The wafer 20, for example, is a 3" (7.75 cm) bulk silicon wafer in the embodiment being described.

Figure 4:
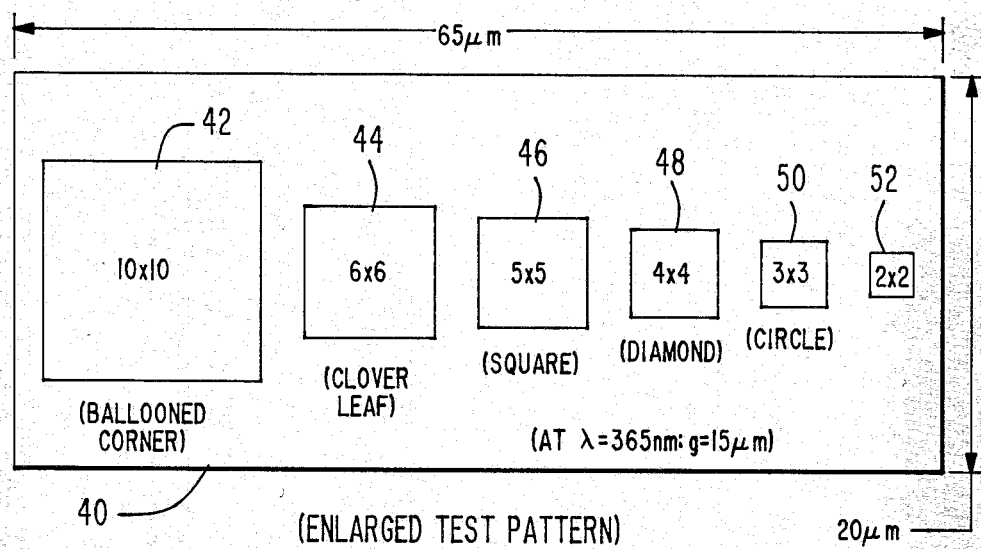
FIG. 4 is a detailed schematic in enlarged representation of a test pattern shown in the mask of FIG. 3.

Reference is now made to FIG. 3 illustrating in enlarged form the mask 16 used in the proximity printer 11 of FIG. 2. Mask 16 comprises a margin portion 36 and a working mask portion 38. A plurality of test patterns 40 are disposed within the pattern of the mask 38 to serve as monitoring or test patterns at appropriate positions on the mask. Each test pattern 40 is formed of a series of apertures as illustrated in FIG. 4 to be described. The test pattern 40 is typically about 65 micrometers long and about 20 micrometers wide. The mask 16 is about 90 mils (2.28 mm) thick and has a dimension of about 4" (10 cm) on each side.

The test pattern 40, as shown in FIG. 4, is formed of a series of preferably square apertures passing through the mask 16. Each of the several apertures has a different dimension than the other apertures that are related to the pattern that will be developed as will be further explained. Thus, a series of apertures 42, 44, 46, 48, 50 and 52 are formed in an array as shown. The dimensions of each aperture is reduced from the largest value of 10 micrometers on each leg for aperture 42 down to a 2 micrometer dimension for the smallest aperture 52. The dimensions for apertures 44–50 of one embodiment are as shown in FIG. 4.

Figure 6B:
Figure 6A:
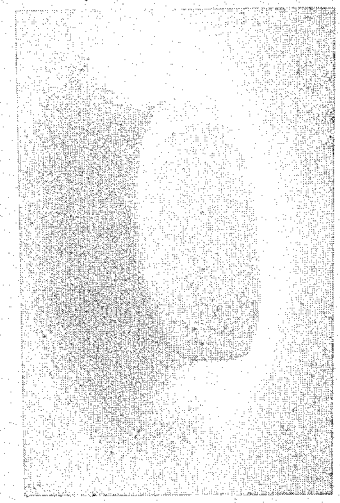
Figure 6C:
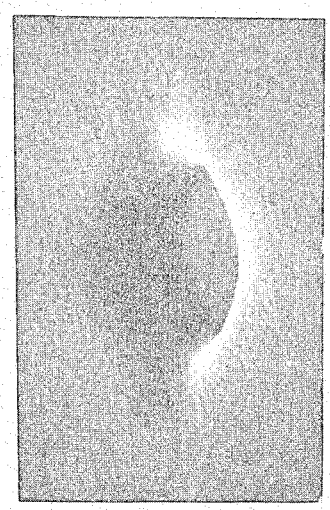
Figure 6E:
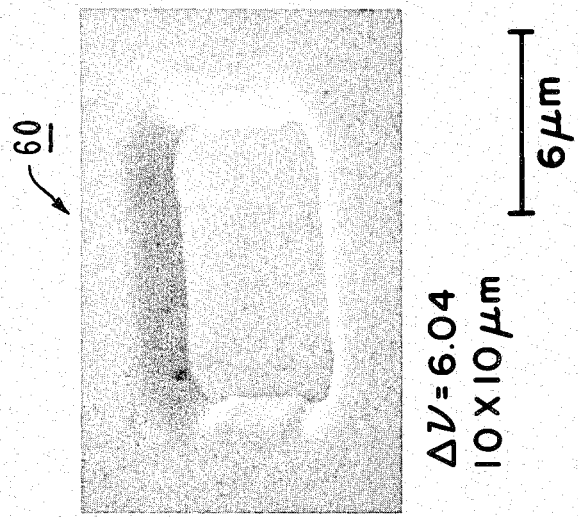
Figure 6D:
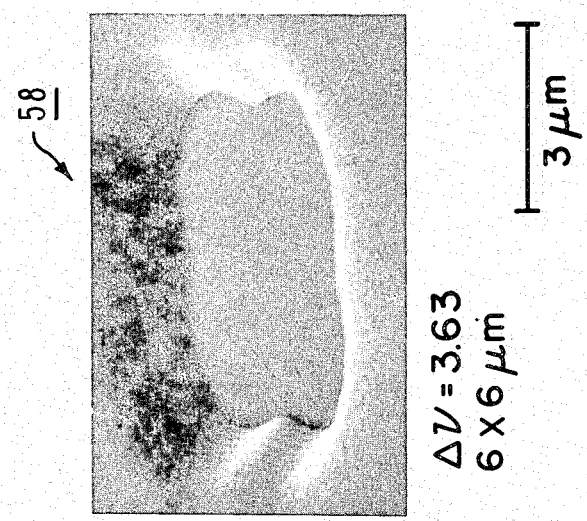

Actinic light from source 24 when passed through the apertures 42–52, will produce diffraction-induced exposures in the surface 22 of the photoresist material. The images produced in the photoresist layer will vary from a square to a circle to a diamond depending upon the dimension of the aperture 42, etc. and the spacing or gap between the wafer and the mask, and the actinic wavelength. For example, in a proximity system described in FIG. 2, using a mercury vapor lamp having a wavelength of 365 nanometers with a gap (g) of 15 micrometers and an aperture such as aperture 46 having a dimension (d) of 5 micrometers, a square pattern will be produced in the resist surface 22. Such a square photoresist image 52 is shown in the micrograph of FIG. 6a. With the same set of conditions for developing the resist image of FIG. 6a, a diamond image 54 as shown in FIG. 6b will be produced through the aperture 48 having a dimension of 4 by 4 micrometers. Similarly, for an aperture 50 having a dimension 3 by 3 micrometers, a circle 56 will be produced in the resist as shown in FIG. 6c. As the aperture increases in size, for example, as shown in FIG. 6d, for an aperture having a dimension of 6 by 6 micrometers, a clover leaf pattern 58 will be produced. For an aperture having a dimension of 10 by 10 micrometers as illustrated by aperture 42 in FIG. 4, a ballooned corner image 60 will be developed as shown in FIG. 6e. Since the dimensions of the mask apertures and the actinic wavelength are generally held constant, a change in position of the image shapes under the respective aperture can be attributed to a deviation from a desired gap (g).

In general, the type of resist, the actinic light source, the gap between the mask and the wafer and the aperture of the mask can alter the image transfer process to the photoresist material significantly. The various patterns that are generated by the actinic light passing through the apertures is based on the diffraction effects. The theory of diffraction patterns are based on the works of Fresnel and Kirchhoff. It is well known in the art that proximity printing phenomenon can be treated with the Fresnel diffraction approximation.

Utilizing Fresnel integrals, an equation useful in evaluating or developing an imaging parameter useful in practicing this invention in a proximity printer (FIG. 2) is based on Fresnel's equation (18p) shown on p. 361 of *Fundamentals of Optics*, by Jenkins and White, Second Edition, McGraw Hill Company, 1950. That equation with appropriate modifications for approximations that are applicable to the proximity printer of FIG. 2, can be represented by the following equation:

$$\Delta \nu = d \sqrt{2/\lambda g}$$

where $\Delta \nu$ is an imaging parameter indicative of the shape of the image (i.e. square 52, FIG. 6a, etc.) developed in the photoresist surface 22, d is the dimension of one side of a square aperture, $\lambda$ is the effective wavelength of the actinic light and g is the gap between the wafer surface 22 and the mask 16 as shown in FIG. 2.

Equation (1) provides for a means to provide a test pattern as desired for a given system to be tested or monitored. For example, if it is desired that the dimension, g, namely the gap between the wafer and the mask, is designed to be 15 micrometers, the pattern 40 can be arranged so that the aperture 46 having a dimension of 5 by 5 micrometers will represent the nominal or reference pattern to monitor for deviations in the distance of the gap g. Applying these dimensions to equation (1) it will be seen that a square resist image will be developed in the surface 22 of the photoresist material for the system described. Actinic light passing through the other apertures (42, 44, 48, 50 and 52) will develop various other patterns as described above and summarized in the following Table I.

TABLE I

| $\nu$ PARAMETERS FOR VARIOUS RESIST IMAGES | |
| --- | --- |
| $\Delta \nu < 2.0$ | Circular Resist Image |
| $\Delta \nu \approx 2.5$ | Diamond Resist Image |
| $\Delta \nu \approx 3.0$ | Square Resist Image |
| $\Delta \nu \approx 3.5$ | Cloverleaf Resist Image |
| $\Delta \nu > 4.5$ | Square with Ballooned Corners |

Figure 5:
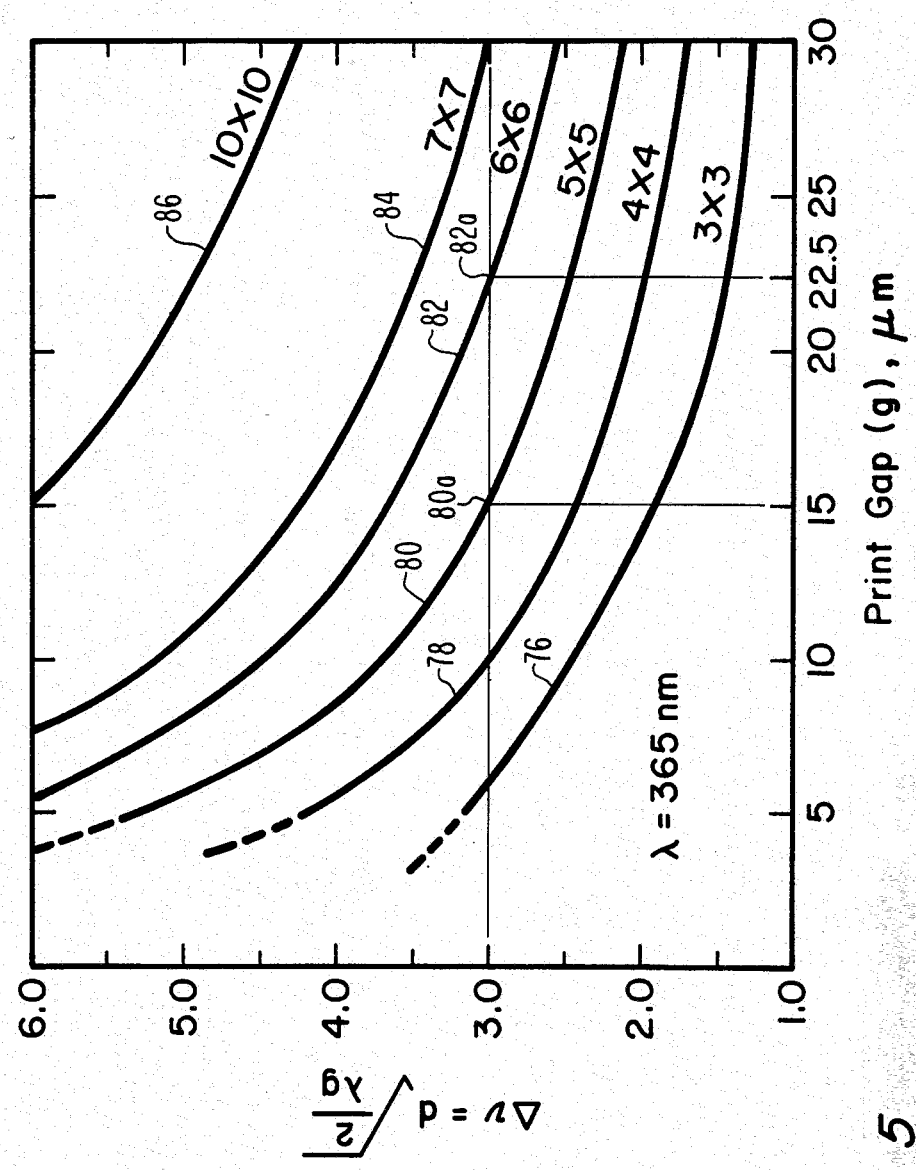
FIG. 5 is a plot of several parameters useful in understanding the invention.

Equation (1) is plotted as the function of the print gap g as shown in FIG. 5. In FIG. 5 the ordinate is the imaging parameter, $\Delta \nu$, and the abscissa is the print gap g. A series of curve plots 76, 78, 82, 84 and 86 are shown representing the change in the imaging parameter as the print gap, g, varies for each of the square apertures 50, 48, 46, 44 and 42 shown in FIG. 4. Curve 84 shows the variation for a 7 by 7 square which is not shown in FIG. 4. The curve plots of FIG. 4 are useful in making a ready or quick evaluation of a change in the print gap that is manifested by a shift in the resist imaging pattern that results from such gap changes. For example, if a square pattern is expected to be seen on the resist surface after development at a position corresponding to square aperture 46 (FIG. 4), for a system designed such as the gap g in equation 1 is 15 $\mu$m the imaging parameter would be 3.0 as seen in Table 1, a value of 3.0 corresponds to a square resist image. This would correspond to point 80a on curve 80 shown in FIG. 5. Point 80a corresponds to the imaging parameter 3 at a print gap of 15 $\mu$m. If it appears that the square image on the developed resist surface was a square aperture at the position corresponding to aperture 44, it will be appreciated that an increase in the print gap by 7.5 $\mu$m will cause a shift in the resist pattern. This is seen from the graph of FIG. 5 by extending the imaging parameter at value 3.0 horizontally through curve 82 at point 82a. Point 82a corresponds to a print gap of about 22.5 $\mu$m. Accordingly, the shift in the pattern from aperture 46 to aperture 44 represents a gap or distance deviation of 7.5 $\mu$m. It should be understood and appreciated that variations that do not precisely match a shift of a square pattern from one aperture to another can nevertheless be determined by interpolation.

Thus, the parameter $\Delta \nu$ can be used as an index or imaging parameter that will be applicable to any system of square apertures, but, it is noted, only in a proximity printer. However, the present embodiment is based on an aperture array in which the apertures are square. Differently shaped apertures would require a different imaging parameter equation than that described above by equation (1). Such an equation can be derived from Fresnel integrals as will be apparent to one skilled in this art. What matters is that a specifically-shaped and somewhat unique photoresist image can be expected for each and every aperture. If, however, the gap (g) that defines the imaging plane varies, the resist image shape will appear in a different aperture than is normally expected. For example, if a square image is expected on the photoresist surface for light passing through aperture 46 with a gap of 15 micrometers, but a square appeared at the location for aperture 44, it would indicate that the gap (g) has increased at that portion of the process by approximately 8 micrometers.

Similarly, at the same exposure by which a square appeared at photoresist portion 44, a cloverleaf would tend to appear through aperture 42 and a diamond would appear through aperture 46, etc. Based on experiments and calculations it appears that a series of apertures from 3 by 3 to 5 by 5 micrometer dimensions are sufficient to monitor gapping deviations in a proximity printer of the type illustrated in FIG. 2. If the aperture dimensions vary by ½ micrometers at a printing gap of 15 to 20 micrometers, a sensitivity to gapping deviations of about ±5 micrometers in gap distances is observed for conventional photoresist materials.

The invention can be practiced using negative resist material. Accordingly, as the resist images resulting from the use of positive resist material in the resist surface resulted in recesses in the pattern corresponding to the resist images developed in the developing process (FIGS. 6a–6e), the use of the negative resist material would result in islands corresponding to those images. Any of the known negative resist materials can be used in the practice of the invention. For example, an HNR resist system from the Hunt Chemical Company may be used. In the practice of the invention it should be appreciated that the response characteristic of the photoresist material is used to determine the wavelength that is used in Equation 1. In general, the lowest wavelength of the response spectrum of the photoresist material is used for Equation 1 to determine the imaging parameter.

For example, if one were to use a mercury vapor lamp and HPR 204 photoresist for a print gap (g) of 15 μm, the wavelength used in Equation (1) would be 365 nanometers noting that the mercury vapor lamp also generates peak responses at 405 and 406 nanometers.

In practicing the invention in an optical printer of the projection type as illustrated by FIG. 1 above, the equation governing focus changes for projection printers generally is given by $$\mu = L \frac{2(NA)^2}{\lambda} \quad (2)$$

where L is the distance out of focus corresponding to distance 92 of FIG. 1, λ is the lowest effect actinic wavelength and NA the numerical aperture of the projection system. The variable μ is the Rayleigh defocus parameter. Since other aberations within the optics of projection printers also contribute to imaging distortions, it is usually desirable to empirically determine the image shapes within the respective aperture for no defocus (i.e. $\mu=0$ when $L=0$). Subsequent changes in position of the various resist image shapes can usually be attributed to defocusing. Changes in position of the image shape are expected to occur for μ parameters greater than 0.5. It appears that in projection systems only squares, diamonds and circle images will result from a square aperture pattern in the mask. My experiments and calculations seem to preclude ballooning corners in the resist images of the kind shown by FIGS. 6d and 6e that occur in the practice of the invention in proximity printers.

Thus, as seen in FIG. 1, the distance between surface 16a of mask 16 and the surface 22a of the photoresist film 22 is the distance 88. The distance between the focusing lens 18 and the photoresist surface 22a is represented by the distance 90 and the out-of-focus, i.e. the parameter L of equation (2), supra, i.e. the defocusing distance from the focal plane coincident with the photoresist surface 22a is the distance 92. It would appear that the distance 88 in the projection printing system of FIG. 1 would be analogous to the distance of the gap, g, of the proximity printer of FIG. 2. However, in the projection printing art, the optics positioned between the mask and the resist substrate can be quite complex and the distance 88 can be quite large. Accordingly, for projection printing systems according to the invention the important parameter of distance deviation is a defocusing distance 92.

A similar set of square apertures can be used to monitor negative or positive resist imaging in projection printers having magnifications of 1:1 to even 10:1. However, a different set or array of aperture sizes would be required than those shown in FIG. 4. Apertures in the 1 by 1 to 3 by 3 micrometer size range would be more appropriate for projection printers.

In order to be sure that a good diffraction pattern is developed through the apertures in proximity printers, it is desirable that the mask be highly non-reflective. Accordingly, the mask is preferably formed of black chrome or iron oxide. Moreover, the gap to resist thickness is important to maintain. I have discovered that a gap that is at least twice the thickness of the photoresist layer 22 is needed to be assured of a good diffraction pattern to be imaged on the photoresist surface. In projection systems, however, both reflective and non-reflective masks can be used.

The coherence of the light source 24 in both proximity and projection systems does influence the image transfer process to the photoresist material. However, to a first approximation, the shape of the images in the resist does not change appreciably with small changes in the coherence of the light. The process of the present invention is preferably used with completely or nearly coherent light sources. Nevertheless, the invention can be used for light sources exhibiting lesser degrees of coherence.

Thus in accordance with this invention, a quantitative estimation of the gapping or focusing deviations can be determined simply by using the mask test pattern and microscopic examination of the resultant shapes of the resist images.

While the preferred embodiment of the invention comprises a mask pattern of several square-cornered apertures, it will be appreciated that a single aperture of known dimensions may be used as a means to estimate gapping or focusing deviations. Thus, a square aperture of a specific dimension will generate a square resist image at a specific gap distance. As the gap distance changes, the resist image shape will change so that one can determine to some extent that a gapping deviation has occurred.

What is claimed is:

1. A method for monitoring a distance or spacial deviations in the distance between a mask and a photoresist surface on a substrate or wafer in an optical printer comprising the steps of:

forming a mask having a pattern of a plurality of differently-sized apertures, each aperture having square corners;

passing light having at least one given wavelength through said mask to produce a characteristic diffraction pattern formed by a different diffraction-induced image for each respective aperture on said photoresist surface spaced from said mask;

each image having a unique predetermined characteristic shape that is diffraction-induced as a function of both the optical distance between the mask and the photoresist surface and the size of the aperture inducing said image; and microscopically examining the shape of the respective photoresist images of the pattern to determine the distance or spacial deviations in the distance between the mask and the surface of the photoresist according to associated apertures inducing the respective images;

the distance or spacial deviation thereof being determined from a predetermined correlation of each said unique image and the associated image-inducing aperture.

2. The method according to claim 1 wherein said printer is a proximity printer and wherein said mask forming step includes selecting each aperture such that the predetermined correlation is defined according to the following relationship:

$$\Delta v = d\sqrt{\frac{2}{\lambda g}}$$

where
- $\Delta v$ is an imaging parameter having values lying in the range of somewhat less than 2.0 to somewhat more than 4.5, each value being indicative of a different one of said unique predetermined characteristic shapes;
- d is the length dimension of the side of a square aperture;
- $\lambda$ is the lowest effective wavelength of the actinic radiation of the photoresist response; and
- g is said distance between the mask and the photoresist surface;

whereby the value of the predetermined correlation ($\Delta v$) for each respective aperture is unique and manifests from the examining step a uniquely shaped image in said pattern at the distance (g) between the mask and surface.

3. The method according to claim 2, wherein the examining step includes determining the distance g when a circular resist image is observed indicating thereby a value of said $\Delta v$ relationship $<2$ for the aperture forming said image.

4. The method according to claim 2, wherein the examining step includes determining the distance g when a diamond resist image is observed indicating thereby a value of said $\Delta v$ relationship $\sim 2.5$ for the aperture forming said image.

5. The method according to claim 2, wherein the examining step includes determining the distance g when a square resist image is observed indicating thereby a value of said $\Delta v$ relationship $\sim 3.0$ for the aperture forming said image.

6. The method according to claim 2, wherein the examining step includes determining the distance g when a cloverleaf resist image is observed indicating thereby a value of said $\Delta v$ relationship $\sim 3.5$ for the aperture forming said image.

7. The method according to claim 2, wherein the examining step includes determining the distance g when a square with ballooned corners is observed indicating thereby a value of said $\Delta v$ relationship $>4.5$ for the aperture forming said image.

8. The method of claim 2 comprising the step of:
selecting the value of a square aperture having a side length dimension d for a predetermined actinic light source and photoresist response;
passing said light through said square aperture;
whereby a specific image shape in the photoresist pattern is indicative of the actual gap distance being g.

9. The method according to claim 1, wherein said printer is a projection printer and wherein said mask forming step includes selecting each aperture such that the predetermined correlation is defined according to the following relationship:

$$\mu = L\frac{2(NA)^2}{\lambda}$$

where
- $\mu$ is a focus parameter having a value greater than 0.5;
- L is the distance out-of-focus;
- $\lambda$ is the lowest effective wavelength of the actinic radiation of the photoresist response;
- NA is the numerical aperture of the projection system;

each of said apertures being a square having a side dimension lying in the range of 1 to 3 $\mu$m, a different side dimension for each respective square being selected to provide a different one of said unique predetermined characteristic shapes;

and the examining step includes determining spacial deviations at the photoresist surface.

10. A method for monitoring spacial deviations between a mask and a photoresist surface on a substrate or wafer in an optical printer comprising the steps of:
forming a mask having an aperture with square corners;
passing light having at least one given wavelength through said mask to produce a characteristic diffraction pattern formed by a diffraction-induced image for said aperture on said photoresist surface spaced from said mask;
said image having a predetermined characteristic shape that is diffraction-induced as a function of both the optical distance between the mask and the photoresist surface and the size of the aperture inducing said image; and
microscopically examining the shape of the photoresist image of the pattern to determine the distance between the mask and the surface of the photoresist surface;
the distance being determined from a predetermined correlation of each said unique image and the size of the image-inducing aperture.

* * * * *